United States Patent Office 3,475,538
Patented Oct. 28, 1969

3,475,538
METHOD AND COMPOSITIONS FOR INDUCING ANTIARRHYTHMIC ACTIVITY IN ANIMALS
Ian William Mathison, Memphis, Tenn., assignor to Marion Laboratories, Inc., Kansas City, Mo., a corporation of Delaware
No Drawing. Continuation-in-part of application Ser. No. 472,660, July 16, 1965. This application July 11, 1966, Ser. No. 564,001
Int. Cl. A61k 27/00; C07d 35/10
U.S. Cl. 424—258                                                 6 Claims

ABSTRACT OF THE DISCLOSURE

Disclosed are 5,6,7 or 8-hydroxy-2-alkyl-1,2,3,4-tetrahydroisoquinolines; 5,6,7 or 8-hydroxy-2-alkyl decahydroisoquinolines; bis-(2-alkyl decahydroisoquinolines) and esters, acid addition salts and quaternary ammonium salts thereof. The compounds have biological activity in animals. Some increase arterial blood flow. Others induce antiarrhythmic activity in animals, especially 5-(3,4,5-trimethoxybenzoyloxy)-2-ethyldecahydroisoquinoline.

This application is a continuation-in-part of copending application Ser. No. 472,660, filed July 16, 1965 which issued as United States Patent No. 3,379,730 on Apr. 23, 1968.

This invention relates to novel chemical compounds and processes of preparing the same. More particularly, this invention is concerned with novel reduction products of hydroxyisoquinolines, particularly such products having biological activity, and novel chemical processes of preparing such reduction products.

According to one aspect of the present invention there are provided novel 5,6,7 or 8-hydroxy-2-R-1,2,3,4-tetrahydroisoquinolines of the formula

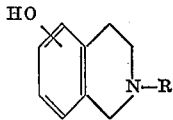

wherein R is a lower alkyl such as methyl, ethyl and propyl, and esters and salts thereof, and novel 5,6,7 or 8-hydroxy-2-R-decahydroisoquinolines of the formula

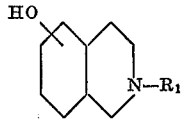

wherein $R_1$ is hydrogen or a lower alkyl such as methyl, ethyl and propyl, and esters and salts of such compounds, as well as bis ethers thereof of the formula

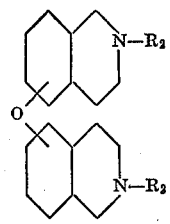

wherein $R_2$ is a lower alkyl such as methyl, ethyl and propyl.

The starting materials used in practicing this invention are the known 5,6,7 or 8-hydroxyisoquinolines with the commercially available 5-hydroxyisoquinoline being most suitable.

The novel 5,6,7 or 8-hydroxy-2-R-1,2,3,4-tetrahydroisoquinolines where R is a lower alkyl can be produced by catalytic hydrogenation, using moderate conditions, of the hydroxy-2-lower alkyl isoquinoline quaternary salt. This process can be represented as follows:

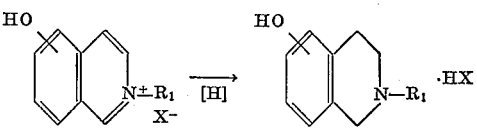

wherein $R_1$ is lower alkyl and X is an anion such as the chloride or bromide ion.

The quaternary salts of the hydroxyisoquinolines can be produced conveniently by reaction of a 5,6,7 or 8-hydroxyisoquinoline with an alkyl halide. Alkyl halides such as methyl chloride, ethyl bromide and propyl bromide may be used in the reaction. The reaction is readily effected by combining the hydroxyisoquinoline and alkyl halide in a suitable liquid reaction medium such as a lower alcohol and particularly ethanol. The reaction mixture can be heated, such as at reflux, to promote the reaction. The desired product can then be recovered from the reaction mixture by conventional isolation techniques.

Reduction of the 5,6,7 or 8-hydroxy-2-lower alkyl isoquinolinium halide using moderate catalytic hydrogenation procedures gives the desired 5,6,7 or 8-hydroxy-2-lower alkyl-1,2,3,4-tetrahydroisoquinoline in the form of a hydrohalide salt which upon treatment with a base such as sodium hydroxide yields the free tertiary amine.

This reduction is conveniently effected using hydrogen at a moderately elevated pressure, such as about 25 to 100 p.s.i., a finely divided platinum oxide catalyst and room temperature. To facilitate the reduction the isoquinoline compound is first dispersed in a suitable organic liquid and advisably one in which the isoquinoline salt is soluble. Ethanol is a particularly suitable solvent for the halide salts. The progress of the reduction can be followed by the hydrogen uptake. Once the theoretical amount of hydrogen has been consumed the reduction can be terminated, the mixture filtered and the filtrate concentrated to crystallize the desired product as the hydrohalide salt.

Some of the 2-alkyl tetrahydroisoquinolines which may be produced as described are 5-hydroxy-2-methyl-1,2,3,4-tetrahydroisoquinoline,
5-hydroxy-2-ethyl-1,2,3,4-tetrahydroisoquinoline,
5-hydroxy-2-propyl-1,2,3,4-tetrahydroisoquinoline,
7-hydroxy-2-ethyl-1,2,3,4-tetrahydroisoquinoline, and
6-hydroxy-2-butyl-1,2,3,4-tetrahydroisoquinoline.

Although it appeared feasible to effect direct decahydrogenation of the 5, 6, 7 or 8-hydroxy-2-lower alkyl isoquinolinium halides to produce the 5, 6, 7 or 8-hydroxy-2-lower alkyl decahydroisoquinolines this reduction, which employs stringent conditions, lead to a bis-(2-lower alkyl decahydroisoquinoline) ether rather than the alcohol. This process can be represented as follows:

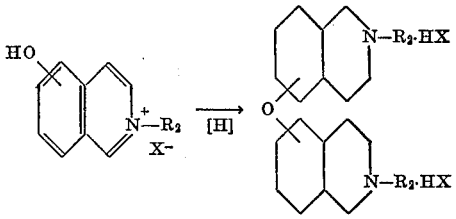

wherein $R_2$ is a lower alkyl and X is a halide ion, and advisably the bromide ion. This reductive condensation can be effected in glacial acetic acid containing a small amount of a strong acid, and particularly sulfuric acid, using an Adams platinum oxide catalyst and hydrogen at about 25 to 100 p.s.i. The hydrogenation proceeds at room temperature and is usually completed in about 5 to 48 hours.

After filtering, the filtrate can be made alkaline and the free base extracted with ether.

Similar ethers may be produced as described in the procedure for bis-(2-ethyldecahydroisoquinoline)ether.

The free base of the ether can then be converted to an acid addition salt such as a hydrohalide or sulfate by conventional procedures or, if desired, quaternary ammonium salts can be formed, such as by reacting the free base with an alkyl halide, alkyl sulfate, aralkyl halide or aralkyl sulfate including methyl chloride, ethyl iodide, ethyl bromide and benzyl chloride.

The unexpectedness of the production of the described ethers is shown by the application of the same process conditions to the tertiary hydroxyisoquinolines. The tertiary amines, as the free bases, are reduced to hydroxy decahydroisoquinolines by hydrogenation in glacial acetic acid using platinum oxide as the catalyst. The process can be represented as follows:

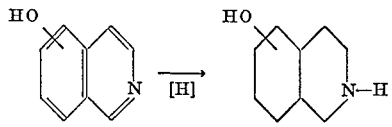

Some of the compounds which may be produced as described are 5-hydroxy decahydroisoquinoline, 6-hydroxy decahydroisoquinoline and 7-hydroxy decahydroisoquinoline.

In order to produce the 5, 6, 7 or 8-hydroxy-2-lower alkyl decahydroisoquinolines it appears necessary to first convert the 5, 6, 7 or 8-hydroxy-2-lower alkylisoquinolinium halide to the corresponding hydroxide and to then hydrogenate the resulting hydroxide. Production of the hydroxide can be readily achieved by reacting the halide with silver oxide. This reaction can be illustrated as follows:

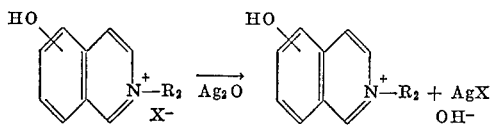

wherein $R_2$ is lower alkyl and X is a halide ion. The reaction proceeds readily in an aqueous lower alcohol such as 50% methanol. The desired product can be isolated from the reaction mixture by conventional procedures. Among the compounds which may be produced in this way are 5-hydroxy-2-ethylisoquinolinium hydroxide, 5-hydroxy-2-methylisoquinolinium hydroxide, 7-hydroxy-2-propylisoquinolinium hydroxide and 8-hydroxy-2-ethylisoquinolinium hydroxide.

Conversion of the 5, 6, 7 or 8-hydroxy-2-lower alkyl isoquinolinium hydroxide to the 5, 6, 7 or 8-hydroxy-2-lower alkyl decahydroisoquinoline can be effected by hydrogenation in glacial acetic acid using a platinum oxide catalyst even though the same conditions lead to the bisether when a halide anion, instead of the hydroxyl anion, is present on the starting material. The process using the hydroxide starting material can be represented as follows:

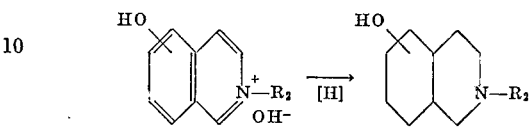

wherein $R_2$ is a lower alkyl.

Some of the 5, 6, 7 or 8-hydroxy-2-lower alkyl decahydroisoquinolines which may be produced as described are 5-hydroxy-2-ethyl decahydroisoquinoline, 5-hydroxy-2-methyl decahydroisoquinoline, 5-hydroxy-2-propyl decahydroisoquinoline, 6-hydroxy-2-butyl decahydroisoquinoline, 7-hydroxy-2-ethyl decahydroisoquinoline and 8-hydroxy-2-methyl decahydroisoquinoline. Acid addition salts and quaternary ammonium salts thereof are readily prepared using procedures known in the art and those described herein.

This invention also facilitates the preparation of benzoic acid esters of the hydroxy-2-lower alkyl-1,2,3,4-tetrahydroisoquinolines and hydroxy-2-lower alkyl decahydroisoquinolines. These esters can be represented by the formulae

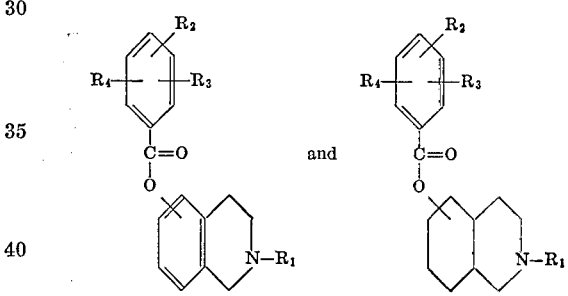

where $R_1$ is lower alkyl and $R_2$, $R_3$ and $R_4$ are hydrogen, lower alkyl such as methyl and ethyl, lower alkoxy such as methoxy and ethoxy, or a halogen such as chlorine and bromine.

The esters may be produced by reacting the appropriate benzoyl halide with a hydroxy-2-lower alkyl-1,2,3,4-tetrahydroisoquinoline or a hydroxy-2-lower alkyl decahydroisoquinoline. These reactions can be represented as follows:

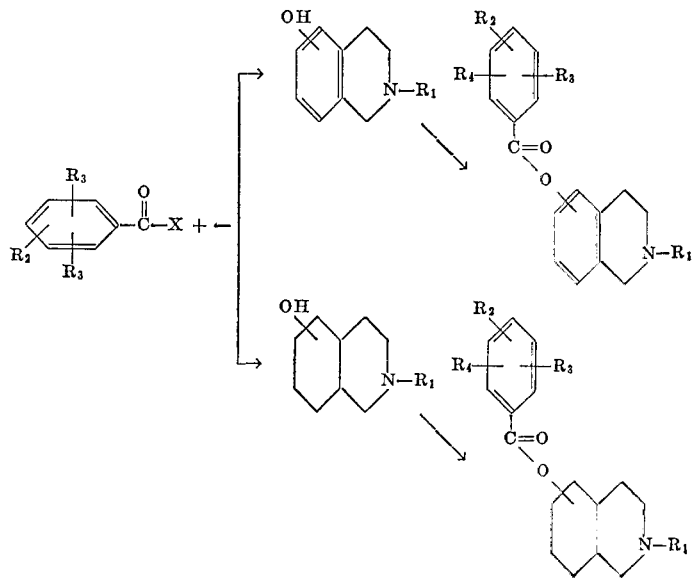

wherein X is a reactive halogen, particularly chlorine or bromine and $R_1$, $R_2$, $R_3$ and $R_4$ have the assigned significance.

The esterification is readily effected in an organic solvent under anhydrous conditions at moderately elevated temperatures and advisably under reflux conditions. Dry benzene and toluene are particularly suitable reaction media. After the reaction is terminated the desired product can be isolated from the reaction mixture by conventional procedures. Somewhat higher esterification temperatures are used to esterify the decahydro compounds because the hydroxy group on such compounds is less reactive than on the aromatic nucleus present in the 1,2,3,4-tetrahydroisoquinolines.

Some of the esters which may be formed as described, using the appropriate reactants, are 5-benzoyloxy-2-ethyl-1,2,3,4-tetrahydroisoquinoline,
5-benzoyloxy-2-ethyl decahydroisoquinoline,
5-(3,4,5-trimethoxybenzoyloxy)-2-ethyl-1,2,3,4-tetrahydroisoquinoline,
5-(3,4,5-trimethoxybenzoyloxy)-2-ethyl decahydroisoquinoline,
5-(3,4,5-trimethoxybenzoyloxy)-2-methyl decahydroisoquinoline,
5-(3,4,5-triethoxybenzoyloxy)-2-propyl-1,2,3,4-tetrahydroisoquinoline,
5-(p-chlorobenzoyloxy)-2-ethyl-1,2,3,4-tetrahydroisoquinoline, and
5-(o-methylbenzoyloxy)-2-ethyl decahydroisoquinoline.

Acid addition salts of the bases of this invention are produced by contacting the compounds with an organic or inorganic acid such as hydrochloric, sulfuric, formic, citric, maleic, succinic and fumaric acids.

Quaternary ammonium salts are formed by contacting the compounds with a suitable alkylating agent such as dimethyl sulfate or an alkyl halide such as methyl chloride and ethyl bromide.

The compounds of this invention, being amines, have use as neutralizing agents. In addition, the compounds may be used in the isolation and purification of penicillin with which they will form salts.

The compounds of this invention also possess biological activity in animals and thus are potentially useful as drugs. They can be used as biologically active standards in evaluating other compounds for similar activity in animals.

A compound of the formulae

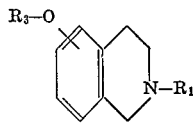

and

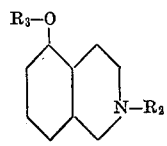

and acid addition and quaternary ammonium salts thereof, wherein $R_1$ represents a lower alkyl, $R_2$ represents hydrogen or a lower alkyl, and $R_3$ represents a benzoyl group of the formula

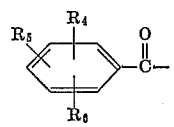

wherein $R_4$, $R_5$ and $R_6$ are hydrogen, lower alkyl, lower alkoxy or halogen, administered in a small but effective and safe amount to an animal induces antiarrhythmic activity in the animal.

Although there is variation in amount of activity between compounds, some of the compounds provided herewith elevate, while some lower, blood pressure in animals. In addition, the compounds generally increase arterial blood flow in animals following intra-arterial injection except for 5-hydroxy-2-ethylisoquinolinium halide (bromide) which decreases arterial blood flow. Increased blood flow would appear desirable in the treatment of peripheral vascular and cerebrovascular insufficiency.

The following data summarizes animal tests with compounds of this invention:

(A) 5-hydroxy-2-ethylisoquinolinium bromide (M-2)

In mice it has an acute approximate $LD_{50}$ of 63-125 mg./kg./i.p.

Following intravenous administration of 5 mg./kg. of M-2 to the bilateral vagotomized anesthetized dog, M-2 produced an increase (50-117 mm. Hg) in arterial blood pressure accompanied by a moderate increase in heart rate while essentially no effects were noted on respiratory rate.

M-2 produced slight inhibition of the carotid occlusion pressor response.

Intra-arterial administration of M-2 decreased peripheral blood flow in the anesthetized dog.

M-2 was devoid of antiarrhythmic activity in the mouse (chloroform-induced ventricular fibrillation) assay procedure. However, the antiarrhythmic activity of quinidine, a well-known antiarrhythmic agent, was found to be potentiated by M-2 in this test. This is shown by the following data:

| Compound: | Dose, mg./kg./i.p. | No. mice protected/ No. mice dosed |
|---|---|---|
| M-2 | 64 | 1/10 |
|  | 94 | 0/5 |
|  | 115 | 0/5 |
| Q.S.[1] | $ED_{50}$ equal | 72(64-81) |
| M-2 plus Q.S. | 50+56 | 14/15 |
|  | 50+50 | 8/15 |
|  | 50+45 | 5/15 |

[1] Q.S. is quinidine sulfate.

The data show that the $ED_{50}$ for quinidine is about 48 when used with M-2. This is much lower than the $ED_{50}$ value of 72 obtained when quinidine was used alone.

(B) 5-hydroxy-2-ethyl-1,2,3,4-tetrahydroisoquinoline HBr (M-3)

In mice it has an acute approximate $LD_{50}$ of 125-250 mg./kg./i.p.

Following intravenous administration of 5 mg./kg. of M-3 to the bilateral vagotomized anesthetized dog, it produced a slight increase in blood pressure and heart rate and a moderate increase in respiratory rate. Central nervous system stimulation was manifested by increased rate of respiration and lessening of depth of anesthesia with decreased skeletal muscle relaxation. Intra-arterial administration of M-3 increased peripheral blood flow in the anesthetized dog.

The vasodilator properties of M-3, as evidenced by increased blood volume flow subsequent to drug administration, were comparable to papaverine when each was administered intra-arterially to the anesthetized dog as shown by the following data:

|  | Dose, mg. | Blood Pressure (mm. Hg) | | Blood Flow (cc./min.) | |
|---|---|---|---|---|---|
|  |  | Before | After | Before | After |
| Papaverine | 0.1 | 133 | 130 | 24 | 48 |
| M-3 | 0.1 | 133 | 133 | 26 | 43 |
| Papaverine | 0.05 | 106 | 109 | 22 | 49 |
| M-3 | 0.05 | 119 | 117 | 24 | 86 |

(C) 5-(3,4,5-trimethoxybenzoyloxy)-2-ethyl-1,2,3,4-tetrahydroisoquinoline HBr (M-6)

In mice it has an acute approximate $LD_{50}$ of 250-500 mg./kg./i.p.

At 5 and 10 mg./kg./i.v. of M-6 in bilateral vagotomized anesthetized dogs a rise of blood pressure of 13 to 25 mm. Hg was obtained with little or no change in heart rate. Intra-arterial administration of M-6 increased peripheral blood flow in the anesthetized dog.

(D) 5-hydroxy-2-ethyldecahydroisoquinoline hydrobromide (M-7)

A dose of 10 mg./kg. administered by the intravenous route to the bilateral vagotomized anesthetized dog produced a slight rise (8 to 11 mm. Hg) in arterial blood pressure. Intra-arterial administration of M-7 produced an increase in peripheral blood flow in the anesthetized dog.

(E) Bis-(2-ethyldecahydroisoquinoline)ether dihydrobromide (M-7a)

A dose of 5 to 10 mg./kg. administered by the intravenous route to the bilateral vagotomized anesthetized dog produced slight effect (+5 to +10 mm. Hg) on arterial blood pressure. Intra-arterial administration of M-7a produced an increase in peripheral blood flow in the anesthetized dog.

The vasodilator properties of M-7a, as evidenced by increased blood volume flow subsequent to drug administration, were comparable to papaverine when each was administered intra-arterially to the anesthetized dog as shown by the following data:

|  | Dose, mg. | Blood Pressure (mm. Hg) | | Blood Flow (cc./min.) | |
|---|---|---|---|---|---|
|  |  | Before | After | Before | After |
| Papaverine | 0.1 | 130 | 126 | 5 | 23 |
| M-7a | 0.1 | 139 | 135 | 7 | 41 |
| Papaverine | 0.3 | 123 | 119 | 10 | 51 |
| M-7a | 0.15 | 125 | 123 | 12 | 62 |

(F) 5-(3,4,5-trimethoxybenzoyloxy)-2-ethyldecahydroisoquinoline hydrobromide (M-8)

A dose of 1 to 5 mg./kg. administered by the intravenous route to the bilateral vagotomized anesthetized dog produced a slight to moderate (10 to 37 mm. Hg) decrease in arterial blood pressure. Intra-arterial administration of M-8 produced an increase in peripheral blood flow in the anesthetized dog.

Compound M-8 has been found to possess antiarrhythmic activity. This indicates potential usefulness in the treatment and/or prophylaxis of cardiac arrhythmias. Quinidine has been used successfully in the treatment of certain types of abnormal rhythm of the human heart for many years and was therefore used as the standard of comparison. M-8 compares favorably with quinidine. Although M-8 is more potent, it is also more toxic and as a result the two compounds appear to possess a near comparable "safety factor." The term, "safety factor," is the ration of the toxic dose to the effective dose.

M-8 and quinidine were studied for antiarrhythmic activity in dogs with ventricular arrhythmia produced experimentally by interrupting blood flow to the myocardium. In this test, animals are prepared by opening the thorax and ligating the anterior descending branch of the left coronary artery. Test compounds are then evaluated for antiarrhythmic activity on the first postoperative day when he animal is in the unanesthetized state.

Two groups of dogs consisting of 6 animals per group were surgically prepared as described. Group I received 10 mg./kg. of quinidine sulfate and Group II received 2 mg./kg. of Compound M-8. Each compound was administered intravenously over a two minute period while recording the electrocardiogram and femoral arterial blood pressure. In addition, each animal was observed for gross symptoms of toxicity both during and subsequent to administration of the compounds. Measurements of the electrocardiogram and blood pressure were taken during time of drug administration and at 1, 5, 10, 20, 30 and 40 minutes thereafter. Comparative drug effects were obtained by calculating the mean and standard error of change in ventricular rate, ectopic rate and blood pressure. It is to be noted that there was no significant difference ($P<0.05$) between the mean control values for each group prior to drug administration. Results of calculations showed that both compounds slowed ventricular rate and decreased ectopic ventricular rate and that there was no significant difference between the effects of the two compounds. It was further noted that peak activity time and duration of activity of M-8, within the limits of the experimental period, compared favorably with that of quinidine. These data are given in the following Tables I and II.

TABLE I.—EFFECT OF QUINIDINE SULFATE AND M-8 ON TOTAL VENTRICULAR RATE IN CORONARY DOG FOLLOWING INTRAVENOUS ADMINISTRATION

[Total Ventricular Rate (minutes)]

| | Dose, mg./kg. | Control | 1 min. | 5 min. | 10 min. | 20 min. | 30 min. | 40 min |
|---|---|---|---|---|---|---|---|---|
| Compound: | | | | | | | | |
| Quinidine sulfate | 10 | [1] 182±17 | 154±16 | 152±14 | 159±15 | 156±17 | 154±14 | 154±15 |
| M-8 | 2 | 170±9 | 161±7 | 159±7 | 160±8 | 162±5 | 162±6 | 165±6 |

[1] Mean±Standard Error.

TABLE II.—EFFECT OF QUINIDINE SULFATE AND M-8 ON VENTRICULAR ECTOPIC RATE IN CORONARY DOG FOLLOWING INTRAVENOUS ADMINISTRATION

[Ventricular Ectopic Rate (minutes)]

| | Dose, mg./kg./I.V. | Control | 1 min. | 5 min. | 10 min. | 20 min. | 30 min. | 40 min. |
|---|---|---|---|---|---|---|---|---|
| Compound: | | | | | | | | |
| Quinidine sulfate | 10 | 169±21 | 92±31 | 90±33 | 112±30 | 102±36 | 102±33 | 120±24 |
| M-8 | 2 | 153±14 | 34±19 | 93±25 | 86±29 | 118±19 | 115±25 | 128±17 |

The comparative effect of the two compounds on blood pressure are given in the following Table III where it may be noted that near comparable changes were produced in each group at one minute after dosing, at which time the blood pressure was elevated subsequent to M-8 administration and was lowered subsequent to quinidine administration. It should further be noted that qualitative signs of gross toxicity were essentially comparable in each group while quantitative differences in toxic symptoms were not readily apparent.

TABLE III.—EFFECT OF QUINIDINE SULFATE AND M-8 ON ARTERIAL BLOOD PRESSURE IN CORONARY DOG FOLLOWING INTRAVENOUS ADMINISTRATION

[Mean Blood Pressure (mm. Hg)]

| Compound: | Dose, mg./kg./ I.V. | Control | 1 min. | 5 min. | 10 min. | 20 min. | 30 min. | 40 min. |
|---|---|---|---|---|---|---|---|---|
| Quinidine sulfate | 10 | 76±5 | 64±8 | 73±8 | 66±7 | 72±8 | 66±8 | 66±9 |
| M-8 | 2 | 89±5 | 95±4 | 86±6 | 89±6 | 85±5 | 84±5 | 84±4 |

The oral absorption of quinidine sulfate and M-8 was studied in eight additional dogs which were similarly prepared by surgical treatment. Three animals served as controls and received 5 ml./kg. of 0.9% NaCl, two received 20 mg./kg. of quinidine sulfate and the remaining three received 8 mg./kg. of M-8. The compounds were dissolved in 0.9% NaCl and administered with the aid of a stomach tube. Electrocardiogram measurements were recorded (Table IV) and each dog was observed for signs of gross toxicity. Overt toxic signs were not observed in these animals and the effect of the different treatments on ectopic rate is given in the following Table V.

TABLE IV.—TOTAL VENTRICULAR RATE (MINUTES)

| Compound | Dose, mg./kg. P.O. | Control | 1 hour | 2 hour | 3 hour | 4 hour | 5 hour |
|---|---|---|---|---|---|---|---|
| 0.9% NaCl | | 207 | 198 | 204 | 195 | | |
| Quinidine sulfate | 20 | 186 | 178 | 148 | 166 | 148 | 152 |
| M-8 | 8 | 163 | 150 | 136 | 122 | 122 | 121 |

TABLE V.—VENTRICULAR ECTOPIC RATE (MINUTES)

| Compound | Dose, mg./kg. P.O. | Control | 1 hour | 2 hour | 3 hour | 4 hour | 5 hour |
|---|---|---|---|---|---|---|---|
| 0.9% NaCl | | 195 | 190 | 199 | 181 | | |
| Quinidine sulfate | 20 | 152 | 156 | 58 | 146 | 100 | 113 |
| M-8 | 8 | 143 | 97 | 67 | 45 | 72 | 68 |

Comparative toxicity studies using quinidine sulfate and M-8 were conducted in twelve additional unanesthetized dogs which had not previously received any form of treatment. Six dogs received 20 mg./kg. of quinidine sulfate and six received 4 mg./kg. of M-8. At these dose levels, no difference between the compounds was readily apparent in either the nature or severity of toxic signs.

The active agents of this invention can be administered to animals as pure compounds. It is advisable, however, to first combine one or more of the compounds with a suitable pharmaceutical carrier to attain a more satisfactory size to dosage relationship.

Pharmaceutical carriers which are liquid or solid can be used. Solid carriers such as starch, sugar, talc and the like can be used to form powders. The powders can be used for direct administration or they may be used to make tablets or fill gelatin capsules. Suitable lubricants like magnesium stearate, binders such as acacia and gelatin, and disintegrating agents like sodium carbonate in combination with citric acid, or methylcellulose or starch separately, can be used to form tablets.

Unit dosage forms such as tablets and capsules can contain any suitable predetermined amount of one or more of the active agents, and may be administered one or more at a time at regular intervals. Such unit dosage compositions can contain, for example, from about 0.02 to 500 mg. of active agent. However, about 20 mg. is considered the highest amount which is needed for the active compounds in the unit dosages. Such unit dosage forms, however, should generally contain a concentration of 0.1% to 50% by weight of one or more of the active compounds.

A typical tablet can have the composition:

| | Mg. |
|---|---|
| 5 - (3,4,5-trimethoxybenzoloxy)-2-ethyldecahydroisoquinoline HBr (M-8) | 5 |
| Starch, U.S.P. | 57 |
| Lactose, U.S.P. | 73 |
| Talc, U.S.P. | 9 |
| Magnesium stearate | 6 |
| Acacia | 10 |

The oral route of administration is preferred. However, other routes, such as by injection, can be employed when warranted.

The following examples are presented to illustrate the preparation of compounds within the scope of this invention.

EXAMPLE 1

5-hydroxy-2-ethylisoquinolinium bromide

Forty grams (0.28 mole) of 5-hydroxyquinoline was dissolved in 100 ml. of absolute ethanol and refluxed for 8 hours on a steam bath with 50% excess ethyl bromide (40 g.) (0.37 mole). The ethanol and excess ethyl bromide was then evaporated off and the resulting brown solid recrystallized from ethanol to yield 57.47 g. (82%) of light brown needles, M.P. 209.4–210.6° C.

*Analysis.*—Calcd. for $C_{11}H_{12}NOBr$: C, 51.97; H, 4.73; N, 5.51; Br, 31.50. Found: C, 51.77; H, 4.68; N, 5.13; Br, 31.50.

EXAMPLE 2

5-hydroxy-2-ethyl-1,2,3,4-tetrahydroisoquinoline hydrobromide

Five grams (0.0196 mole) of 5-hydroxy-2-ethylisoquinolinium bromide was dissolved in 250 ml. of absolute ethanol and hydrogenated ("Parr" hydrogenation apparatus) over 300 mg. of Adams' platinum oxide at 40 lbs. per sq. in. pressure at room temperature. A white crystalline solid separated when the hydrogenation was terminated (5 hrs.). The hydrogenated suspension was heated on a steam bath until the precipitated solid had redissolved; the exhausted catalyst was then filtered off. The filtrate was concentrated, from which 4.5 g. (90%) of colorless plates crystallized on cooling, M.P. 223.8–

224.6° C. The ultraviolet spectrum of this compound had $\lambda_{max}$ 272 and 277 m$\mu$ (log $\epsilon$3.24 and 3.23, respectively).

*Analysis.*—Calcd. for $C_{11}H_{16}NOBr$: C, 51.17; H, 6.20; N, 5.43; Br, 31.01. Found: C, 51.17; H, 6.06; N, 5.42; Br, 31.28.

EXAMPLE 3

5-(3,4,5-trimethoxybenzoyloxy)-2-ethyl-1,2,3,4-tetrahydroisoquinoline hydrobromide Four and three-tenths grams (0.0166 mole) of 5-hydroxy-2-ethyl - 1,2,3,4 - tetrahydroisoquinoline hydrobromide was dissolved in 100 ml. of water and sodium hydroxide solution added until no further precipitation was evident. The resulting suspension was extracted with ether, dried, and the solvent removed to yield 3.0 g. (100%) of white solid. This base was dissolved in 100 ml. of dry benzene and added to a solution of 4.0 g. (0.0173 mole) of 3,4,5-trimethoxybenzoyl chloride in 100 ml. of dry benzene. Two grams of dry sodium bicarbonate was added to this mixture and the whole refluxed for 8 hours on a steam bath. The gelatinous precipitate which separated out was filtered (3.3 g.) and the filtrate extracted with dilute hydrochloric acid. This acid extract, made alkaline with sodium hydroxide, was extracted with ether and dried. The ether was removed to yield 3.6 g. of a pale yellow oil. The hydrobromide salt of this base was recrystallized from ethanol-ether to yield 3.7 g. (32.3%) as short white needles, M.P. 213.2–213.4° C.

*Analysis.*—Calcd. for $C_{21}H_{26}NO_5Br$: C, 55.75; H, 5.75; N, 3.10; Br, 17.70. Found: C, 55.59; H, 5.71; N, 3.18; Br, 17.80.

EXAMPLE 4

5-hydroxydecahydroisoquinoline and hydrochloride

Five grams of 5-hydroxyisoquinoline was dissolved in 50 ml. of glacial acetic acid and 0.5 ml. of concentrated sulfuric acid added. The resulting solution was hydrogenated over 5 g. of Adams' platinum oxide at 50 lbs. per sq. in. pressure for 36 hours at room temperature. The exhausted catalyst was filtered from the hydrogenated solution and the filtrate diluted with approximately 50 ml. of water, made alkaline by the addition of sodium hydroxide pellets, and extracted with ether. The dried ethereal extract was evaporated carefully to yield a yellow oily residue (2.7 g.) which was treated with dry hydrogen chloride in ether to yield 2.9 g. (51%) of the base hydrochloride, recrystallized from ethanol-ether, M.P. 191.0–193.0° C. The ultraviolet spectrum of this compound was taken in water and showed no absorption throughout the range 220–340 m$\mu$.

*Analysis.*—Calcd. for $C_9H_{18}NOCl$: C, 56.25; H, 9.38; N, 7.29; Cl, 18.75. Found: C, 56.33; H, 9.43; N, 7.22; Cl, 18.80.

EXAMPLE 5

5-hydroxy-2-ethyldecahydroisoquinoline and hydrobromide

Eight grams (0.031 mole) of 5-hydroxy-2-ethylisoquinolinium bromide was treated with moist silver oxide, prepared from the action of sodium hydroxide on silver nitrate (13 g.), in 100 ml. of a 50% aqueous methanol solution for 24 hours. The silver bromide formed was then filtered from the solution using celite/charcoal mixture as a filter aid. The solvent was evaporated off under reduced pressure at as low a temperature as possible to yield 5.7 g. (96%) of 5-hydroxy-2-ethylisoquinolinium hydroxide. This compound was hydrogenated as described in Example 4. The resulting 5-hydroxy-2-ethyldecahydroisoquinoline was converted to the hydrobromide 5.62 g. (81%), which was recrystallized from ethanol-ether to yield fine white needles, M.P. 218.4–219.0° C. The ultraviolet spectrum of this compound indicated no absorption in the range 220–310 m$\mu$.

*Analysis.*—Calcd. for $C_{11}H_{22}NOBr$: C, 50.00; H, 8.33; N, 5.30; Br, 30.31. Found: C, 49.80; H, 8.31; N, 5.52; Br, 30.38.

EXAMPLE 6

5-(3,4,5-trimethoxybenzoyloxy)-2-ethyldecahydroisoquinoline and hydrobromide

Five grams (0.027 mole) of 5-hydroxy-2-ethyldecahydroisoquinoline was dissolved in 20 ml. of sodium dried toluene and added to a solution of 15 g. (0.065 mole) of 3,4,5-trimethoxybenzoyl chloride and refluxed for 48 hours. The resulting suspension was filtered and the toluene filtrate extracted with dilute hydrochloric acid. Neutralization of this acid extract was followed by extraction with ether. The ether extract was dried and evaporated to yield a brown viscous oil. This was purified by chromatography on a Florosil column and eluted with petroleum ether (60–90° C.) ether (10:1). Large prisms separated from the fractions on standing overnight. This material was crystallized from petroleum ether (30–60° C.) to yield 4.52 g. (52%) of large prisms, M.P. 99.8–100.3° C.

*Analysis.*—Calcd. for $C_{21}H_{31}NO_5$: C, 66.82; H, 8.28; N, 3.71. Found: C, 67.06; H, 8.32; N, 3.64.

One gram of the base was converted to the hydrobromide and recrystallized from ethanol-ether to yield 1.06 g. (88%) of short white needles, M.P. 197.8–198.6° C.

*Analysis.*—Calcd. for $C_{21}H_{32}NO_5Br$: C, 55.02; H, 7.04; N, 3.06; Br, 17.43. Found: C, 55.12; H, 7.15; N, 3.11; Br, 17.50.

EXAMPLE 7

Bis-(2-ethyldecahydroisoquinoline)ether

Five grams of 5-hydroxy-2-ethylisoquinolinium bromide was dissolved in 50 ml. of glacial acetic acid with the aid of gentle heating on a steam bath. Five-tenths ml. of concentrated sulfuric acid was added and the mixture hydrogenated over 5 g. of Adams' platinum oxide at 50 lbs. per sq. in. pressure for a period of 36 hours at room temperature. The exhausted catalyst was filtered, the acidic filtrate diluted with water and made strongly alkaline by the addition of sodium hydroxide solution. The base was then extracted with ether and converted to the hydrobromide salt. Upon recrystallization from ethanol-ether, 2.14 g. (42%) of fine white needles were obtained, melting at 196.6–197.1° C. The ultraviolet spectrum of this compound showed no absorption through the range 220–310 m$\mu$. The infrared spectrum (KBr) showed a medium absorption band at 1,110 cm.$^{-1}$ in accordance with the absorption reported for an ether linkage in L. J. Bellamy, "The Infrared Spectra of Complex Molecules," Wiley and Sons, New York, 1958, p. 115.

*Analysis.*—Calcd. for $C_{22}H_{42}N_2OBr$: C, 52.52; H, 8.29; N, 5.49; Br, 31.31. Found: C, 52.57; H, 8.48; N, 5.41; Br, 31.20.

EXAMPLE 8

Diethiodide of Bis-(2-ethyldecahydroisoquinoline)ether

The diethiodide derivative of the basic ether of Example 7 was prepared by refluxing the free base, obtained from the neutralization of 1.0 g. of bis-(2-ethyldecahydroisoquinoline)ether dihydrobromide, dissolved in 25 ml. of dry benzene, for 4 hours with excess ethyl iodide. The precipitated quaternary iodide was filtered and recrystallized from an alcohol-ether mixture to yield 0.93 g. (72%) of fine white needles, M.P. 245.0–245.4° C. The infrared spectrum (KBr) showed a medium intensity absorption band at 1110 cm.$^{-1}$.

*Analysis.*—Calcd. for $C_{26}H_{50}N_2OI_2$: C, 47.28; H, 7.63; N, 4.24; I, 38.43. Found: C, 47.28; H, 7.40; N, 4.27; I, 38.20.

What is claimed is:

1. The method of inducing antiarrhythmic activity which comprises administering about 0.02 to 500 mg.

of 5-(3,4,5-trimethoxybenzoyloxy)-2-lower alkyl decahydroisoquinoline, or a nontoxic acid addition salt thereof, to an animal.

2. The method of inducing antiarrhythmic activity which comprises administering about 0.02 to 500 mg. of 5-(3,4,5-trimethoxybenzoyloxy) - 2 - ethyl decahydroisoisoquinoline, or a nontoxic acid addition salt thereof, an animal.

3. The method of inducing antiarrhythmic activity which comprises administering about 0.02 to 500 mg. of 5-(3,4,5-trimethoxybenzoyloxy)-2-methyl decahydroisoquinoline, or a nontoxic acid addition salt thereof, of an aminal.

4. A pharmaceutical composition comprising about 0.02 to 500 mg. of 5-(3,4,5-trimethoxybenzoyloxy)-2-lower alkyl decahydroisoquinoline, or a nontoxic acid addition salt thereof, admixed with a pharmaceutical carrier.

5. A pharmaceutical composition comprising about 0.02 to 500 mg. of 5-(3,4,5-trimethoxybenzoyloxy)-2-ethyl decahydroisoquinoline, or a nontoxic acid addition salt thereof, admixed with a pharmaceutical carrier.

6. A pharmaceutical composition comprising about 0.02 to 500 mg. of 5-(3,4,5-trimethoxybenzoyloxy)-2-methyl decahydroisoquinoline, or a nontoxic acid addition salt thereof, admixed with a pharmaceutical carrier.

References Cited

UNITED STATES PATENTS

| | | | |
|---|---|---|---|
| 2,681,911 | 6/1954 | Cusic | 260—287 |
| 3,317,541 | 5/1967 | Umezawa et al. | 260—287 |

OTHER REFERENCES

Ser. No. 352,325 Kulz et al., Alien Property Custodian April 1943, Therapeutically Active Tetrahydroisoquine Compounds.

FRANK CACCIAPAGLIA, JR., Primary Examiner

UNITED STATES PATENT OFFICE
CERTIFICATE OF CORRECTION

Patent No. 3,475,538            October 28, 1969

Ian William Mathison

It is certified that error appears in the above identified patent and that said Letters Patent are hereby corrected as shown below:

Column 3, line 60, the formula

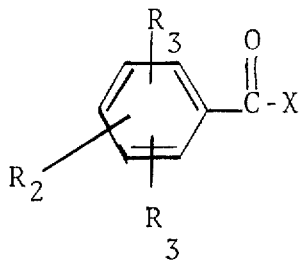  should read  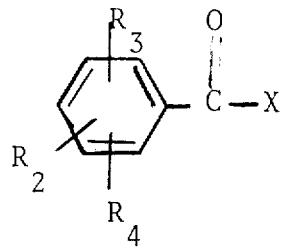

Column 7, line 19, "+5" should read -- -5 --. Column 8, line 14, "he" should read -- the --. Column 10, line 14, "trimethoxybenzoloxy" should read -- trimethoxybenzoyloxy --. Column 13, line 8, before "an animal" insert -- to --; line 12, "of" should read -- to --; line 13, "aminal" should read -- animal --.

Signed and sealed this 26th day of May 1970.

(SEAL)
Attest:

EDWARD M. FLETCHER, JR.            WILLIAM E. SCHUYLER, JR.
Attesting Officer            Commissioner of Patents